United States Patent [19]

Rehn

[11] 4,066,132
[45] Jan. 3, 1978

[54] DISK HARROW WITH BEAM MEMBER SUSPENDED BY U-SHAPED SPRINGS

[75] Inventor: Gary Allen Rehn, Andover, Ill.

[73] Assignee: Deere & Company, Moline, Ill.

[21] Appl. No.: 659,596

[22] Filed: Feb. 20, 1976

[51] Int. Cl.$^2$ .............................................. A01B 5/06
[52] U.S. Cl. .................................. 172/572; 172/643; 172/711
[58] Field of Search ............... 172/117, 142, 500, 570, 172/571, 572, 573, 577, 582, 583, 619, 621, 643, 711

[56] References Cited

U.S. PATENT DOCUMENTS

| 564,133 | 7/1896 | Woodlan | 172/572 |
| 2,750,861 | 6/1956 | Erwin | 172/573 |
| 2,985,248 | 5/1961 | Richardson | 172/619 |
| 3,576,216 | 4/1971 | Tanke | 172/570 |
| 3,640,348 | 2/1972 | Womble | 172/573 |

Primary Examiner—Richard T. Stouffer

[57] ABSTRACT

Disk gangs are resiliently suspended from an implement frame by retroverted flat spring members. Flat surfaces of the springs are oriented perpendicularly to the disk blade shaft to thereby permit vertical and fore-and-aft flexing of the disk gangs as obstacles are encountered and yet minimize lateral movement of the gangs to retain gang blade alignment between front and rearwardly positioned disk gangs.

2 Claims, 5 Drawing Figures

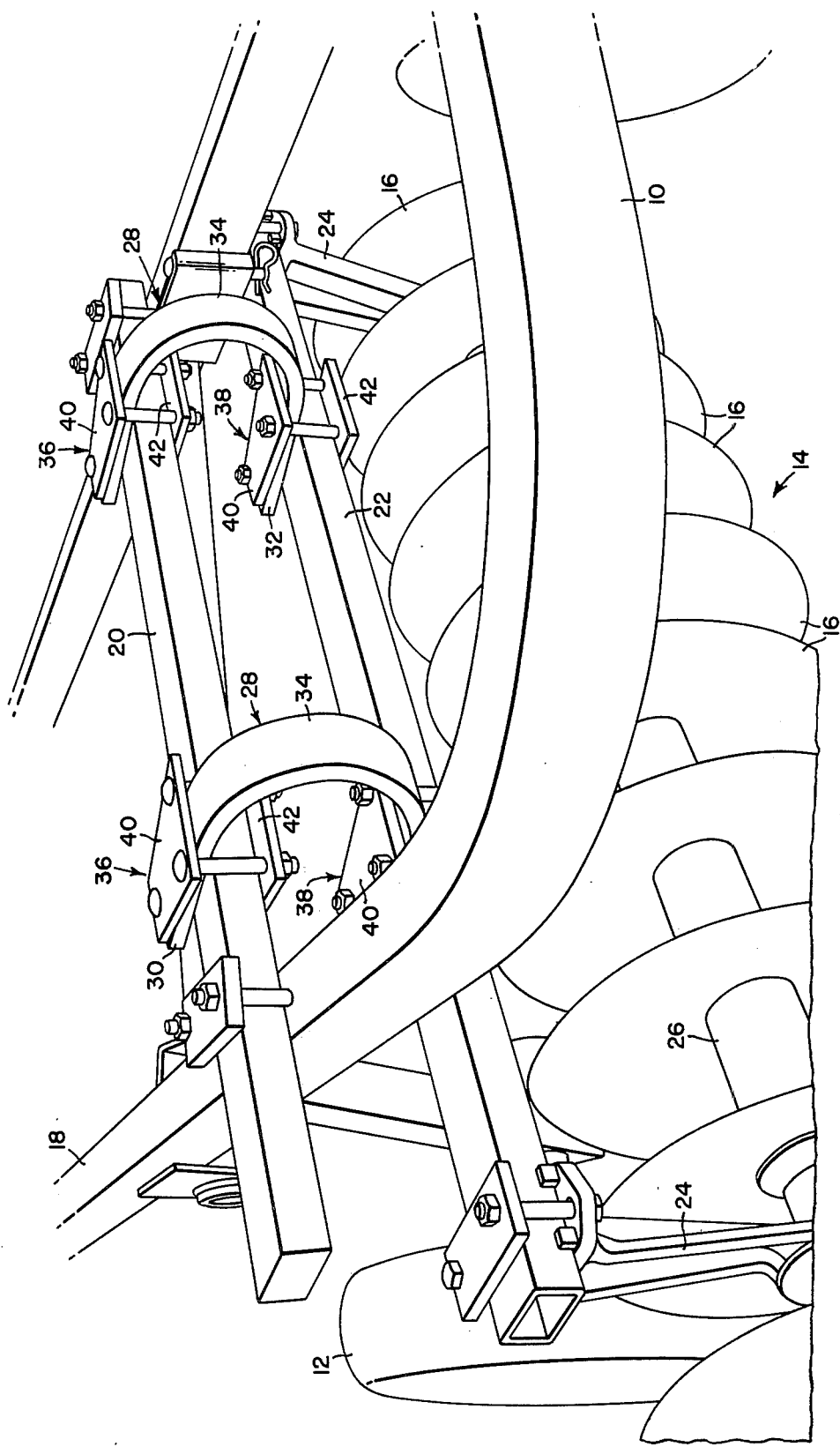

DISK HARROW WITH BEAM MEMBER SUSPENDED BY U-SHAPED SPRINGS

BACKGROUND OF THE INVENTION

The present invention relates generally to agricultural implements, and more particularly to means for resiliently mounting a gang of earthworking tools on the mobile frame of an agricultural implement.

Modern agricultural implements such as disk tillers and disk harrows are becoming wider, longer and heavier as the farmer seeks to improve his productivity and profitability. As the weight of these implements and frames increases, it becomes desirable to mount the tool gangs on the frame in a resilient rather than rigid manner, so that the gangs independently yield to insure that uneven ground is worked to a uniform depth. Additionally, as the width of implement frames increases, shocks encountered by individual implement tools increase, particularly when rocky or stumpy fields are worked.

Various means have been devised for resiliently mounting a gang of earthworking tools on an implement frame. For example, disclosed in U.S. Pat. No. 3,706,345, a U-shaped torsion bar is utilized between the gang standard and standard support shaft to provide a cushioning effect in the vertical and fore-and-aft directions. In U.S. Pat. No. 3,640,348 there is disclosed a resilient standard supporting a disk gang shaft upon which the disk blades are rotatably mounted. This resilient standard cushions shocks absorbed in a transverse direction as well as fore and aft and vertical. However, the shocks are transmitted directly to the shaft supporting the disk blades. When the disk gang shaft or bolt has to absorb shocks encountered in operating, it may bend or after repeated shock loading may fracture. Further, the working tools or disk blades often become misaligned resulting in premature failure of the disk bearings.

SUMMARY OF THE INVENTION

It is therefore a principal object of the present invention to provide a means for resiliently suspending a gang of earthworking tools from an implement frame whereby shock impacts received in vertical, transverse and fore-and-aft directions are absorbed and dissipated to minimize structural damage to the gang and implement.

It is a further object to provide a compact means for resiliently suspending a gang of eathworking tools wherein the buildup of trash and other objects during operation is minimized. It is also an object to provide a simple and reliable means of suspension which is inexpensive to manufacture and maintain.

In pursuance of these and other objects, the invention comprises a tubular member carried by and supported on a disk implement frame and a pair of spaced-apart rearwardly opening generally C-shaped flat springs suspended from the tubular member and secured to a tubular gang frame which in turn supports a gang of disk blades.

BRIEF DESCRIPTION OF THE DRAWINGS

FIG. 1 is a perspective view illustrating a resiliently suspended disk gang.

DESCRIPTION OF THE PREFERRED EMBODIMENT

Figure 3:
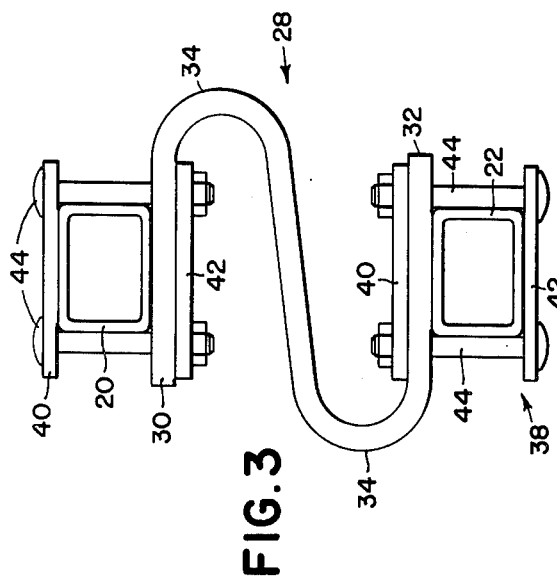
FIG. 3 is a view similar to FIG. 2 showing a modified form of the invention.

Referring now to the drawings, there is illustrated in FIG. 1 a disk harrow frame 10 with ground wheels, one of which is shown at 12, which support the frame 10 at a constant height relative to the ground, and a transversely positioned disk gang 14 suspended from the frame 10. The gang 14 includes a plurality of earthworking disk blades 16. However, any type of tool supported in a gang could utilize the invention.

Supported on the upper surface 18 of the mobile frame 10 is an elongated first tubular or beam member 20. The gang 14 is comprised of a similar second beam member or gang frame tube 22 having a pair of spaced-apart support arms 24 depending therefrom. A gang bolt or shaft 26 is supported from the arms 24 and has rotatably mounted thereon the spaced-apart disk blades 16.

Resiliently suspending each gang 14 from its respective first tubular member 20 are spaced-apart rearwardly opening flat springs 28.

As illustrated in FIG. 1, each spring 28 includes upper and lower flat portions 30 and 32 respectively joined by a vertical fore-and-aft opening C-shaped portion 34. A flat spring is utilized since the majority of shocks encountered will cause the gang 14 to move vertically and/or in a fore-and-aft direction. However, since shocks will also be encountered which will result in transverse forces, a spring capable of dissipating tranverse forces is provided.

A first bracket 36 secures the upper flat portion 30 of each spring 28 to the upper surface of the first tubular member 20 and a second similar bracket 38 secures the lower flat portion 32 of each spring 28 to the upper surface of the gang frame tube or second tubular member 22. By securing the spring 28 to the adjacent surface of the tubular members 20 and 22, greater clearance is provided to minimize trash buildup encountered during the operation. Each bracket 36 and 38 includes upper and lower flat plate members 40 and 42 respectively. The upper plate member 40 cooperates with tubular member 20 or 22 to clamp spring flat portions 30 and 32 therebetween. Bolts 44 secure the parts together and the rearward most bolt passes through an opening in the C-shaped spring flat portion to secure it between the bracket plates. To provide greater support for the spring flat portions during operations, a bracket flat plate member having a horizontal surface area greater than the tubular member bottom surface is provided.

The first and second tubular members 20 and 22 are mounted generally parallel and generally transverse to the direction of movement. Each C-shaped spring 28 is secured between the tubular members 20 and 22 and opens in a fore-and-aft direction generally perpendicular to the line defined by the tubular members 20 and 22. While the suspension spring 28 utilized in the current embodiment opens to the rear, it is also arranged to absorb transverse shock loading and yet return the disks 16 to their original path of operation. Were the disks 16 held rigid in a transverse direction, damage could more easily be caused to the disk blades 16 and structural members of the harrow.

In operation, the farmer will raise the ground-engaging wheels 12 thereby lowering the disk gang 14 to the ground. As the disk frame 10 and its earthworking tools are towed across the field, each individual gang 14 will penetrate the ground to a generally uniform depth since each gang 14 is resiliently suspended and can therefore conform to ground contours.

As occasionally happens, rock, stumps and other solid materials are encountered during the disking operation. When such an object is encountered by a disk blade 16, the forces resulting from the shock impact will be transferred through the blade 16 to the shaft 26, through the arms 24 and out the second tubular member 22 to the suspension spring 28. Were the disk blade 16 rigidly mounted with the frame 10, the shock impact could not be cushioned and the frequency and likelihood of structural damage resulting would be increased. As solid objects are encountered by the disk blades 16, the gang 14 is suspended for movement to the rear and up, or transversely to the side as may become necessary to cushion all the forces encountered in the shock.

Figure 5:
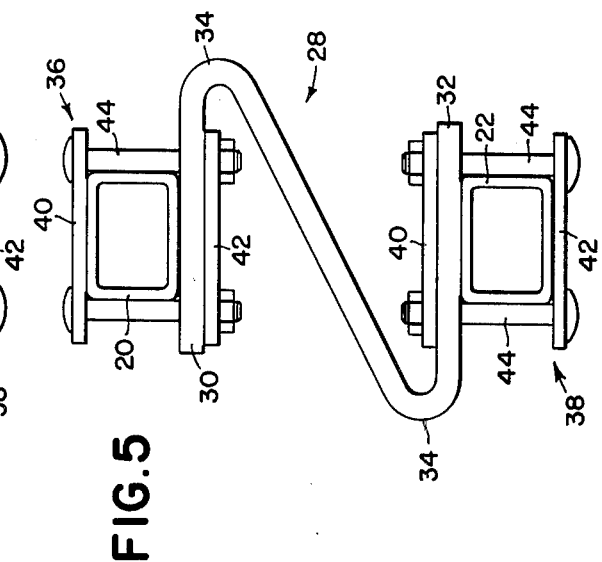
FIG. 5 is a view similar to FIG. 2 showing still a further form of the invention.
Figure 2:
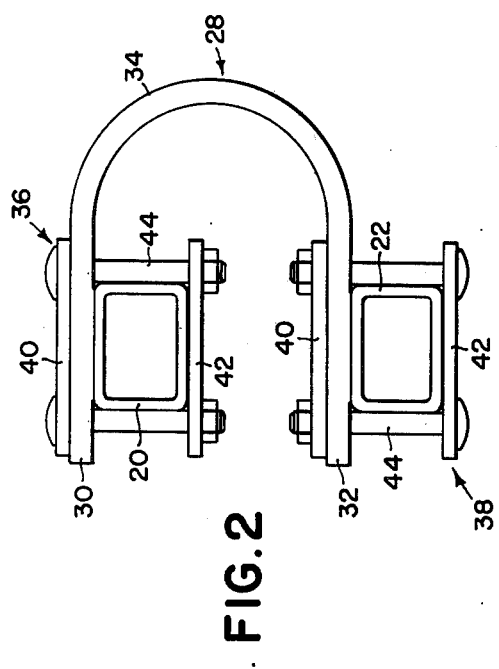
FIG. 2 is an enlarged side view of a C-shaped resilient suspension.
Figure 4:
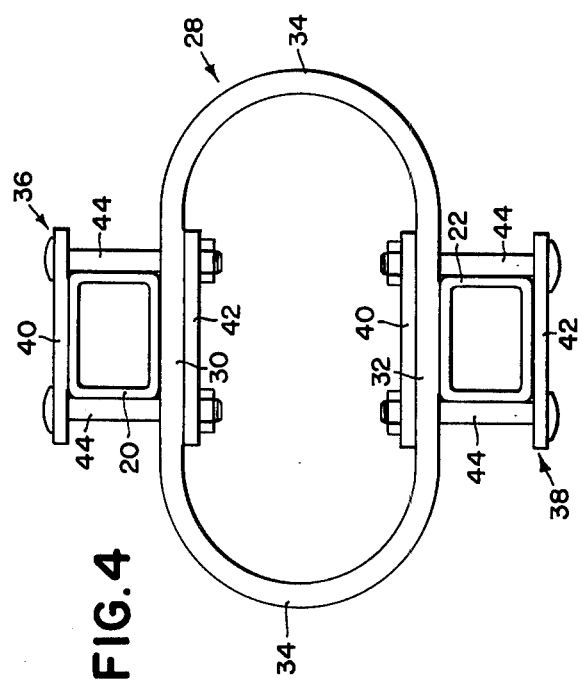
FIG. 4 is a view similar to FIG. 2 showing a further modified form of the invention.

Illustrated in FIGS. 3, 4 and 5 are modifications of the suspension spring utilized in the invention. FIG. 2 illustrates a side view of the spring utilized while FIG. 3 illustrates an S-shaped flat spring opening along generally fore-and-aft lines. FIG. 4 illustrates an O-shaped flat spring designed to also be suspended along generally fore-and-aft extending lines. FIG. 5, which illustrates a Z-shaped spring could also be used in place of the preferred spring illustrated in FIG. 2. Each of the illustrated spring modifications are comprised of flat spring material designed to cushion vertical and fore-and-aft forces and also incur, absorb and dissipate transverse forces without incurring structural damage to the spring gang or frame structures.

I claim:

1. In a disk harrow comprising: a mobile frame having laterally spaced apart frame members; a first beam member transversely fixed to the frame in overlying relationship thereto and having a rectangular cross section with horizontally extending upper and lower flat surfaces; a second beam member beneath and generally parallel to the first beam member, said second beam member also having a rectangular cross section with horizontally extending upper and lower flat surfaces; a pair of spaced apart support arms attached to the second beam member and depending therefrom; a plurality of blades mounted on a common shaft carried by the support arms; spaced apart U-shaped spring members disposed between the laterally spaced apart frame members, the base section of each spring member extending forwardly from the beam members and generally vertically therebetween, with the leg section of each spring member extending rearwardly from the base section and having flat upper and lower portions, each flat portion disposed adjacent a horizontal surface of a respective beam member; and clamp means bearing against the opposite horizontal surfaces of each beam member for securing the respective flat section of the spring member thereto.

2. The invention defined in claim 1 wherein the clamp means are further characterized as having upper and lower horizontal plate members secured together, one plate member adjacent a horizontal flat portion of a respective spring member and the other plate adjacent a respective surface of a respective beam member.

* * * * *